June 8, 1937.  A. STOIKOWITZ  2,082,853
INTERNAL COMBUSTION ENGINE
Filed Feb. 23, 1935   2 Sheets-Sheet 1

Inventor:
Alexander Stoikowitz
By: Lee J. Gary
Attorney

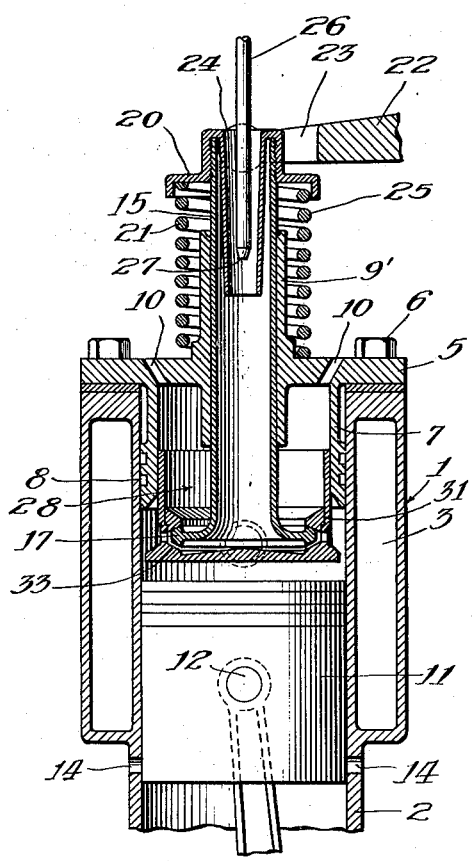
Fig. 4.
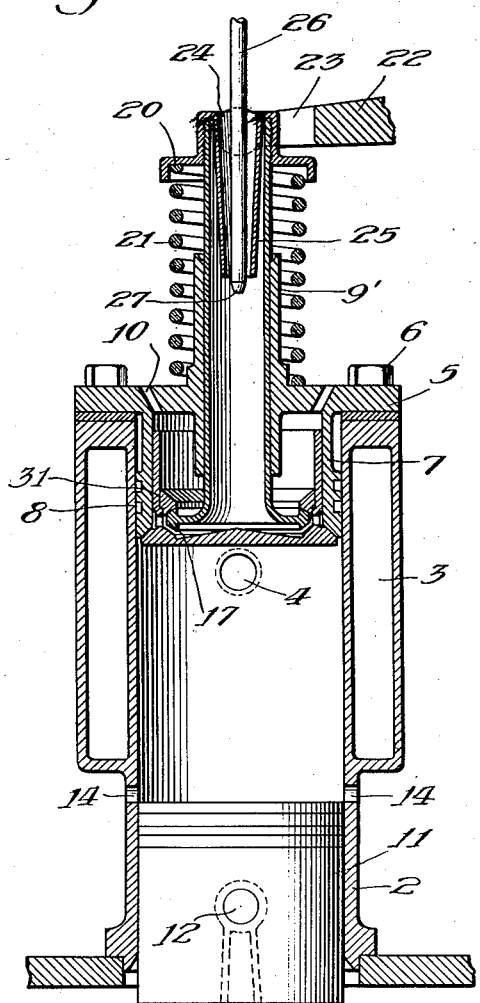
Fig. 5.
Fig. 6.
Fig. 7.
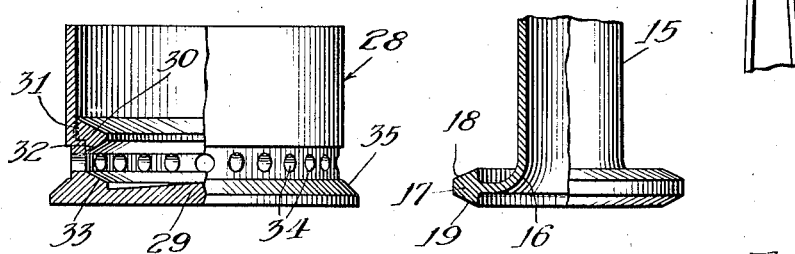
Inventor:
Alexander Stoikowitz,
By: Lee J. Gary
Attorney Patented June 8, 1937

2,082,853

UNITED STATES PATENT OFFICE 2,082,853

INTERNAL COMBUSTION ENGINE

Alexander Stoikowitz, Hammond, Ind.

Application February 23, 1935, Serial No. 7,749

6 Claims. (Cl. 123—79)

This invention relates to improvements in an internal combustion engine of the four-stroke cycle, overhead valve type, in which combustion takes place at constant volume characterized in that its efficiency is relatively high as is also the developed horse power per pound of weight of the engine.

One of the objects of my invention resides in a power cylinder construction wherein better fuel utilization at variable loads and speeds is obtained. Another object of my invention is to increase the volume and weight of the combustible fuel-air mixture taken into the power cylinder during the intake stroke, thereby increasing the power output the unit volume of the piston displacement.

Another object of my invention is to expel a maximum volume of residual waste gases or products of combustion from the combustion chamber during the exhaust stroke, thereby improving the efficiency of combustion.

A further object of my invention is to improve the composition, vaporization and mixing of the fuel-air mixture during the intake stroke, thereby improving the efficiency of combustion.

Other objects and advantages of my invention will be apparent from the accompanying drawings and following detail description.

In the drawings, Fig. 1 is a vertical cross sectional view of the power cylinder, illustrating the relative position of the various working parts at the end of the compression stroke. Figs. 2, 3, 4 and 5 are similar sectional views illustrating the relative positions of the working parts at the end of the power stroke, end of the exhaust stroke, beginning of the intake stroke and, end of the intake stroke respectively.

Fig. 6 is a vertical elevational view, parts being broken away and parts being shown in section of the cylinder valve.

Fig. 7 is a similar view of a cooperating portion of said valve.

Figure 1:
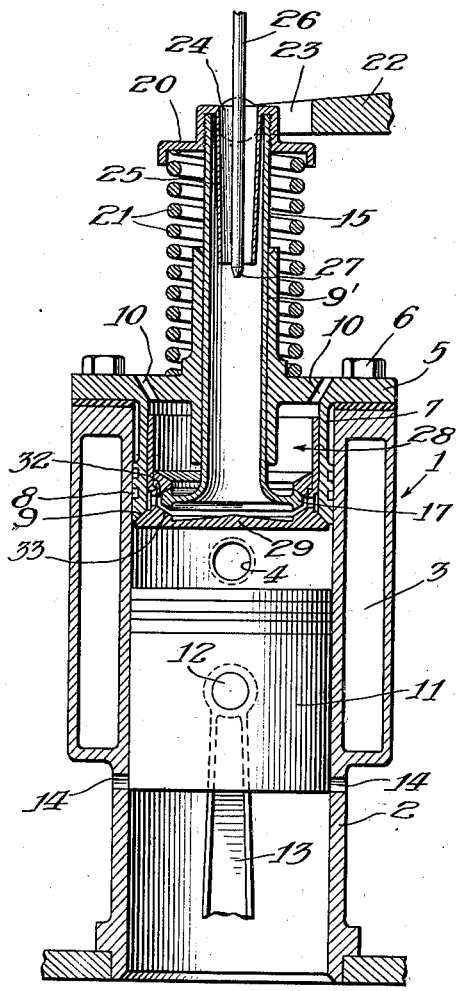

Referring in detail to the drawings, 1 indicates generally a power cylinder of an internal combustion engine of the four-stroke or Otto cycle type. The cylinder 1 comprises cylinder walls 2, those portions of the walls which define the cylinder and combustion chamber being partly jacketed as indicated at 3. A spark plug 4 or other igniting agency may be positioned in the side walls 2, the ends of the electrodes thereof being substantially flush with the internal surface of said walls.

A cylinder head 5 may be mounted upon the upper portion of the cylinder and may be secured thereto by bolts 6 or the like. Gaskets of the conventional type may be interposed between the head 5 and the upper portion of the cylinder. Integrally formed with head 5 and projecting downwardly into the cylinder proper adjacent walls 2 is a cylinder extension 7, the outer surface of which may carry packing rings 8 adapted to render the joint between walls 2 and cylinder 7 pressure tight. The lower inner edge of cylinder 7 may be chamfered to form a valve seating surface 9 as shown best in Fig. 3, the purpose of which may be hereinafter fully described. Head 5 may carry centrally thereof a tubular collar or guide 9' which extends above and below the plane of the head. The head 5 is also provided with a series of apertures 10 through which exhaust gases may escape from the combustion chamber as will be hereinafter described.

A piston 11 may be slidably positioned within walls 2 and may be connected by wrist-pin 12 to connecting rod 13 which, in turn, may be operatively associated with a crank shaft (not shown). Exhaust ports 14 may be provided in walls 2 immediately above the lower dead-center position of piston 11, as shown best in Figs. 2 and 5.

A tube 15 is adapted to be slidably positioned within the collar or guide 9', that portion of the tube which extends within the cylinder being flared outwardly as shown at 16. The end of the flared portion of the tube may terminate in an annular rim 17, the upper and lower surfaces of which are bevelled as indicated at 18 and 19 in Fig. 7. As will be hereinafter more fully described, the surfaces 18 and 19 are adapted to be valve seating surfaces. The opposite end of tube 15 may be externally threaded to receive the internal threads of a cap 20. A coil spring 21 is adapted to be confined between the upper portion of the cylinder head 5 and the cap 20. A rocker arm 22 having a bifurcated end 23 may be adapted to bear upon opposite sides of the cap 20 and is adapted to resist the compressive force of spring 21. Rocker arm 22 may be pivoted and the opposite end thereof may be actuated by a suitable cam mechanism. The cam mechanism associated with the arm 22 is not illustrated but being of conventional construction this mechanism will be clearly understandable to those skilled in the art.

The central portion of the cap 20 is apertured as shown at 24 and a tapered tube 25 extends downwardly from the top of the cap to the interior of tube 15. A pipe 26 may extend downwardly within tube 25 and may terminate in nozzle 27 which is positioned adjacent the restricted end of tube 25. The arrangement is such that pipe 26 carries a fluid fuel which is discharged through nozzle 27. Simultaneously with said discharge air passes through aperture 24 downwardly within tube 25, the velocity of said air being a maximum at the restricted end of said tube. Consequently, a most efficient mixture of air and combustible fluid is obtained.

A piston valve 28 may be slidably positioned within cylinder 7, said valve being closed at its bottom as at 29. Annular ring 30 may be secured, by means of welding or the like 31 to the inner wall of the valve, the lower edge of the ring being tapered or bevelled to form a valve seating surface 32. An annular inclined surface 33 is formed adjacent the bottom 29 which, as will be hereinafter described also serves as a valve seat. Provided in the walls of the piston valve 28 intermediate the seating surfaces 32 and 33 is a plurality of apertures 34. As will be hereinafter more fully described piston valve 28 is adapted to be positioned within cylinder 1, the outer walls of said valve being in slidable contact with the inner surface of the cylinder 7. At the lower end of piston valve 28 an outwardly projecting inclined surface 35 may be provided which at various portions of the cycle of operation is adapted to register with the annular inclined surface 9 provided at the bottom of the cylinder extension 7.

Rim 17 of tube 15 is adapted to be positioned betwen surfaces 32 and 33 within piston valve 28 and when said tube is raised, surfaces 18 and 32 are brought into pressure-tight contact. When tube 15 is depressed, surfaces 19 and 33 are brought into pressure-tight contact. The mean thickness of rim 17 is so related to the mean distance between surfaces 32 and 33 that when surfaces 18 and 32 are in contact, communication is established between apertures 34 and the underside of tube 15 and when surfaces 19 and 33 are in contact, communication is established between apertures 34 and the upper inner portion of the piston valve 28.

In describing the operation of my invention reference will be made to Figs. 1, 2, 3, 4 and 5 which illustrate the various positions of the mechanism as hereinbefore described at different phases of the cycle.

Referring particularly to Fig. 1, the various instrumentalities comprising my engine are shown in their relative positions when the piston 11 is positioned at upper dead center at the end of the compression stroke. When the piston 11 is so positioned arm 22 will have raised to permit spring 21 to urge tube upwardly. It will be noted that the upper bevelled surface 18 of the rim 17 is in contact with the lower bevelled surface 32 of ring 30. Piston valve 28 will be positioned in its uppermost position thereby bringing surfaces 9 and 35 into contact. It can readily be seen that the bottom 29 of piston valve 28 when in this position, comprises the upper defining wall of the combustion chamber of the cylinder. Slightly earlier in the operation and substantially before piston 11 passes upper dead center, the igniting device 4 is discharged thereby causing combustion and rise of pressure of the combustible mixture previously introduced into the cylinder and compressed by the piston.

Figure 2:
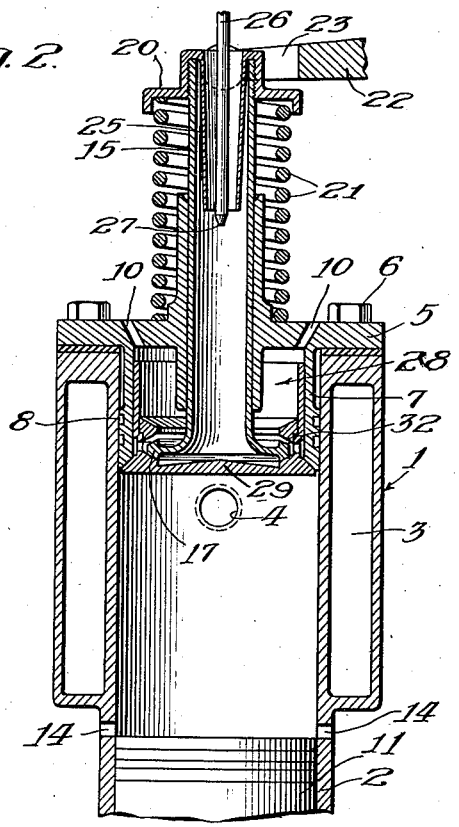

During expansion of the gases confined within the combustion chamber, piston 11 is driven downwardly until it reaches its lower dead center position, as illustrated in Fig. 2. During the downward travel of piston 11 comprising the power stroke, arm 22 will so depress tube 15 as to cause surface 19 on rim 17 and surface 33 within piston valve 28 to come into contact. During the downward passage of piston 11, ports 14 at the lower portion of the cylinder will be closed by said piston. However, when the piston reaches its lower dead center position, ports 14 are exposed and consequently an appreciable quantity of the expanding gases within the cylinder are discharged through said ports.

Figure 3:
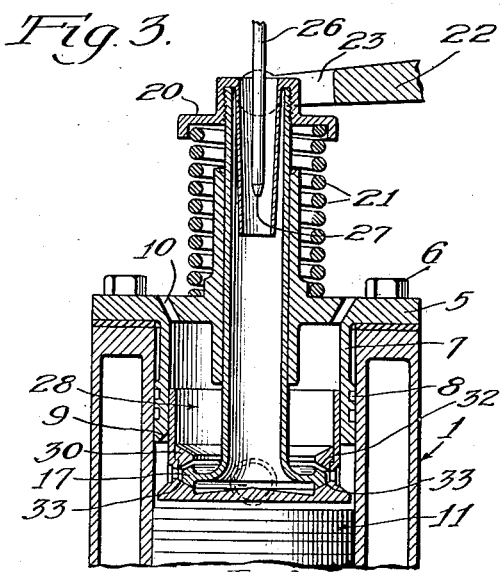

Referring particularly to Fig. 3, the piston 11 is shown as just completing the exhaust stroke. As has been hereinbefore described during the power stroke of the piston, tube 15 is moved downwardly bringing surfaces 19 and 33 into contact. However, said tube has not as yet unseated surface 35 from surface 9. After the piston reaches its lower dead center position and is about to ascend to carry out the exhaust operation, arm 22 acts to so move tube 15 as to cause said tube to unseat surface 35 from the surface 9. Consequently, during the ascent of piston 11 which tends to force the remaining products of combustion within the cylinder upwardly, piston valve 28 simultaneously descends. After surface 35 leaves seat 9, communication will be established between the combustion chamber and apertures 34 which are uncovered by the downward movement of the piston valve. Consequently, the residual gases within the cylinder and combustion chamber are expelled through apertures 34 and between surfaces 18 and 32 which are now in spaced relationship with respect to each other. It can readily be seen that the converging movements of piston 11 and piston valve 28 tend to expel substantially all of the residual gases from the cylinder and combustion chamber and leave a clearance space of relatively small volume.

Referring particularly to Fig. 4, the position of the various instrumentalities comprising the engine are shown at a period just after piston 11 is past upper dead center at the beginning of the suction stroke. In this position arm 22 has so acted as to permit tube 15 to move upwardly under the impulse of spring 21. The first action which takes place upon upward movement of tube 15 is the closing of the exhaust ports by means of the contact effected between surfaces 18 and 32 due to friction of piston valve 28 in cylindrical surface 7. Simultaneously communication is established between the combustion chamber and the interior of the tube 15 through apertures 34. Consequently, as the piston 11 moves downwardly during the suction stroke, the combustion chamber being in communication with the interior of tube 15 within which a combustible mixture is maintained, said mixture will be drawn into the cylinder of the engine. Simultaneously with the downward travel of piston 11, piston valve 28 is lifted through the agency of tube 15 acting under the influence of spring 21, until piston 11 reaches its lower dead center position immediately following the intake stroke at which time surface 35 of the piston valve seats upon surface 9 of cylinder 7.

Referring particularly to Fig. 5, piston 11 is shown at its lower dead center position immediately before traveling upwardly to compress the combustible mixture drawn into the cylinder. It will be observed that when piston 11 is at its lower dead center position, said piston exposes ports 14. Normally the pressure within the cylinder at the end of the suction or intake stroke is slightly below atmospheric pressure. However, when ports 14 are exposed, air is drawn into the cylinder and brings the pressure therein up to atmospheric. After piston 11 passes its lower dead center position it begins traveling upwardly to compress the combustible mixture in the cylinder and said operation is terminated when said piston reaches the position within the cylinder shown in Fig. 1. Near this period spark plug 4 fires and the operation hereinbefore described is repeated.

It can readily be seen that at the end of the power stroke a relatively large quantity of exhaust gases escape through ports 14. When the piston ascends immediately thereafter, piston valve 28 simultaneously descends and displaces a considerable volume of the combustion chamber. Consequently, when the piston 11 reaches its upper dead center position at the termination of the exhaust stroke substantially all of the remaining burned products of combustion are expelled from the combustion chamber and escape through ports 10. In other words, a relatively high percentage of scavenging is obtained, which, of course, contributes to the efficiency of combustion, that is, the fuel-air mixture introduced during the intake stroke is not contaminated by the presence of an excessive quantity of inert exhaust gases.

In addition, the fuel-air mixture is induced into the cylinder and combustion chamber of the engine by the simultaneous diverging movements of the piston 11 and piston valve 28. The air enters the tube 15 through the opening 24 in cap 20 and passes through tube 15, between surfaces 19 and 33 and into the combustion chamber. The fuel-air mixture enters the combustion chamber through a fully open intake valve during the entire suction stroke; it also enters and passes through the tube 15 with minimum obstruction and therefore the pressure thereof is only slightly below atmospheric. Moreover, near the end of the intake stroke the ports 14 are uncovered and consequently permits air to pass into the cylinder through said ports tending to bring the pressure within the cylinder to atmospheric pressure.

The triple valve action, that is, the valve action during exhaust, scavenging and intake, increases the quantity and improves the quality of the fuel-air mixture and thereby increases the power output per unit volume of piston displacement.

As hereinbefore described, the fuel-air mixture enters the cylinder with a minimum pressure drop. It also enters into a comparatively cool cylinder; the quick and unidirectional escape of the highly heated exhaust gases through the exhaust ports 14 keeps the cylinder walls at a relatively low temperature. This keeps the entering fuel-air mixture at a lower temperature and consequently its density and weight will be greater.

The overhead valve action in conjunction with the exhaust ports 14 creates three constant conditions in the cylinder, namely; a minimum of residual waste gas dilution, and a maximum cylinder filling at atmospheric pressure; from the latter it follows that the compression pressure is constant.

A metered quantity of fuel is sprayed from nozzle 27 into the interior of the tube 15, which forms a vaporizing and mixing chamber, the fuel striking the heated surfaces is instantly vaporized. The air for combustion then picks up and mixes with the fuel vapor and enters the cylinder through the piston valve ports 34 in the form of a circular spray directed into contact with the wall of the combustion chamber. This creates a violent turbulence in the air stream, and insures complete vaporizing and mixing of fuel and air at variable induction velocities.

Another advantage inherent in the absence of residual waste gases is that the fuel particles are brought into closer contact with the oxygen of the air which results in an increase in the velocity of combustion and develops the maximum pressure as early as possible in the power stroke.

When maximum power is required, the amount of fuel passed through pipe 26 may be increased, giving a rich fuel-air mixture suitable for maximum power. As the load decreases, the amount of fuel may be decreased, giving a lean fuel-air mixture proportional to the load.

The absence of residual waste gas contamination in a lean fuel-air mixture widens its explosive limits and permits the use of leaner fuel-air mixtures, which otherwise would be difficult to ignite, and slow in burning. A lean but pure fuel-air mixture can also withstand higher compression, and since the compression pressure is equal at full and at partial loads, the thermal efficiency is a constant.

Due to the inherent property of my engine of increasing the power output per unit volume of piston displacement, an internal combustion engine of this type will be a small, lighter and more economical engine to build.

It is to be understood, of course, that those features of the internal combustion engine which comprise the concept of my invention are not dependent upon the specific method of cooling shown and described. For instance, the engine may be of the air cooled type wherein the water jackets may be supplanted by radiating fins. Other modifications, of course, are also contemplated so long as the fundamental concept of my invention remains unaltered.

I claim as my invention:

1. An internal combustion engine comprising in combination, a cylinder, a power piston slidably positioned in said cylinder, a hollow piston valve reciprocally positioned in the upper portion of said cylinder, said valve being provided with a plurality of inlet and exhaust apertures, means for reciprocating said piston valve to establish communication between the combustion chamber of the cylinder and the interior of the piston valve, said means comprising a hollow valve stem which serves as means for the introduction of the fuel mixture supply, and means for simultaneously establishing communication between said hollow valve stem and said apertures to introduce said combustible mixture into said combustion chamber on the suction stroke of the power piston, and close communication between said apertures and the interior of the piston valve, said means, on the exhaust stroke, establishing communication between the combustion chamber and the interior of the piston valve.

2. An internal combustion engine comprising in combination, a cylinder, a head for said cylinder, a hollow valve stem slidably positioned in said head, a power piston slidably positioned in said cylinder, a piston valve slidably positioned in said cylinder, a pair of seating surfaces carried on the inner surface of said piston valve, the wall of said piston valve being provided with an aperture opening into the interior thereof between said seating surfaces, a valve carried by said hollow valve stem cooperatively positioned between seating surfaces of said piston valve, means for moving said valve stem to seat said valve upon one of said seating surfaces to permit communication between said aperture and the interior of the hollow valve stem, means within said hollow valve stem for mixing air and fuel, and means for establishing communication between said aperture and the combustion chamber of said cylinder.

3. An internal combustion engine comprising in combination, a cylinder, a head for said cylinder, a hollow valve stem slidably positioned in said head, a power piston slidably positioned in said cylinder, a piston valve slidably positioned in said cylinder, a pair of seating surfaces carried on the inner surface of said piston valve, the wall of said piston valve being provided with an aperture opening into the interior thereof between said seating surfaces, a valve carried by said hollow valve stem cooperatively positioned between seating surfaces of said piston valve, means for moving said valve stem to seat said valve upon one of said seating surfaces to permit communication between said aperture and the interior of said piston valve, the interior of said piston valve communicating with the atmosphere, and means for establishing communication between said aperture and the combustion chamber of said cylinder.

4. An internal combustion engine which comprises in combination, a cylinder, a power piston slidably positioned in said cylinder, a piston valve slidably positioned in said cylinder adjacent the combustion chamber thereof, means for moving said piston valve into said combustion chamber to displace a portion of the volume thereof during the exhaust stroke of the power piston, said piston valve being provided with an aperture openable into said combustion chamber during said exhaust stroke through which the exhaust gases escape to the interior of the piston valve.

5. An internal combustion engine comprising in combination, a cylinder, a head mounted upon said cylinder, a cylinder depending from said head adjacent the walls of said first mentioned cylinder, a piston valve slidably positioned in said depending cylinder, said piston valve having a closed bottom defining the top of the combustion chamber, valve seats carried interiorly of said piston valve, a hollow valve stem slidably positioned in said head, a valve carried at the end of said stem being positioned between the valve seats therein, said hollow valve stem serving as means for the introduction of the fuel mixture supply, said piston valve being provided with an aperture opening into the interior thereof between the valve seats, communication through said aperture to the combustion chamber being closed by contact of said depending cylinder and said piston valve, means for moving the hollow valve stem to move said piston valve and establish communication between the combustion chamber and said aperture, and means for establishing communication between said aperture and the interior of said piston valve on a predetermined side of the valve carried by said hollow stem.

6. An internal combustion engine comprising in combination a cylinder, a power piston slidably positioned in said cylinder, a hollow piston valve reciprocally positioned in the upper portion of said cylinder, said valve being provided with a plurality of apertures, means for reciprocating said piston valve to establish communication between the combustion chamber of the cylinder and the interior of said hollow piston valve through said apertures, means closing said apertures to close communication between the interior of the piston valve and said combustion chamber, the superatmospheric pressure in said cylinder during exhaust moving said closing means for establishing communication between the interior of said piston valve and said combustion chamber through said apertures.

ALEXANDER STOIKOWITZ.